Aug. 16, 1966     W. F. HASSEL ET AL     3,267,306
SUPERCONDUCTING INDUCTIVE STORAGE DEVICE
Filed Sept. 9, 1963
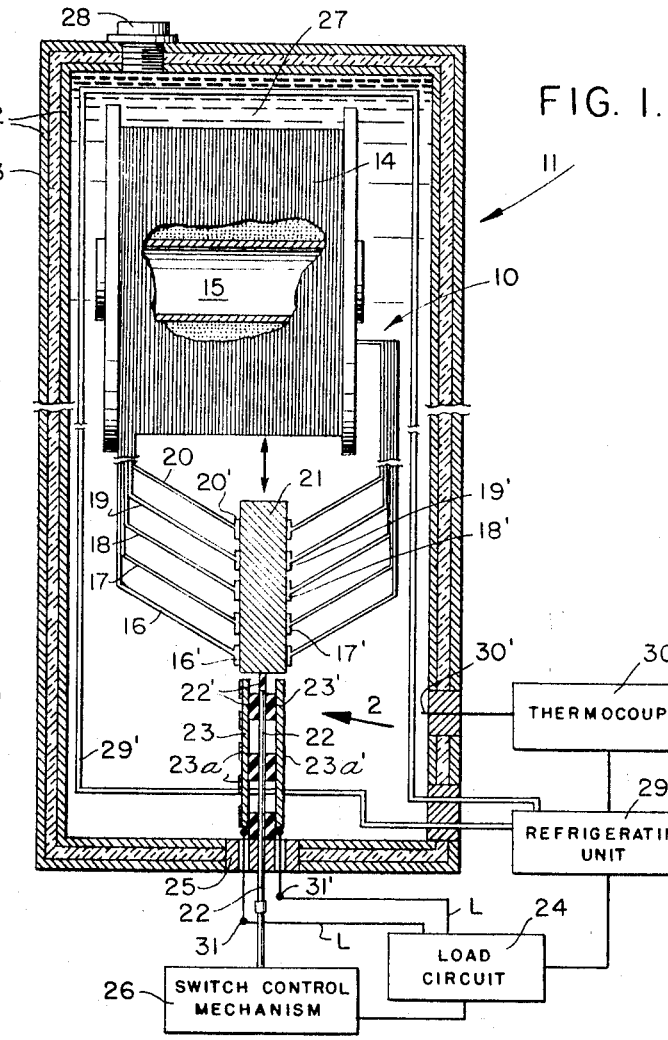
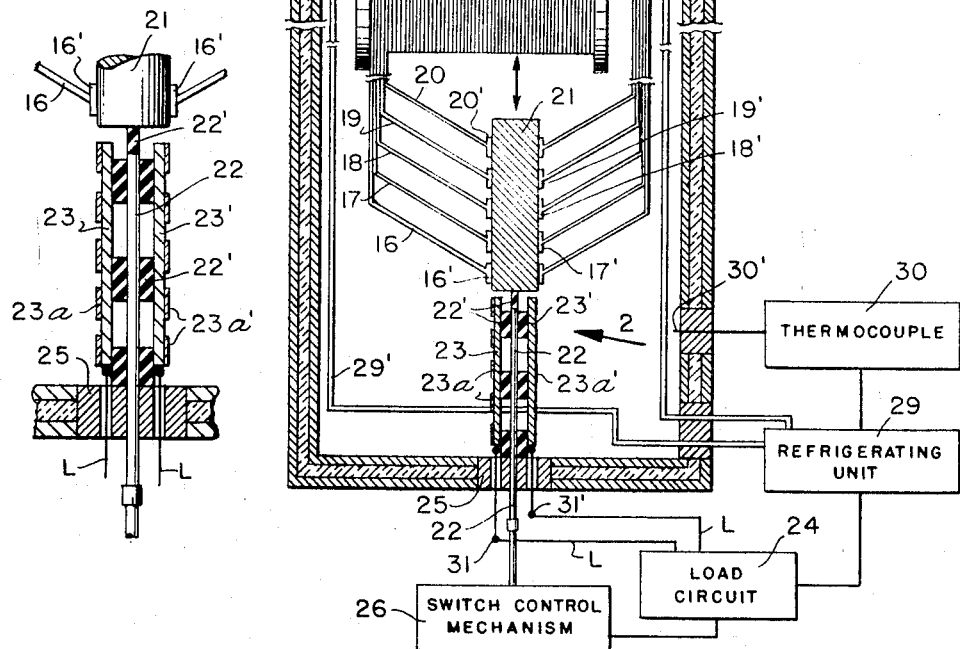
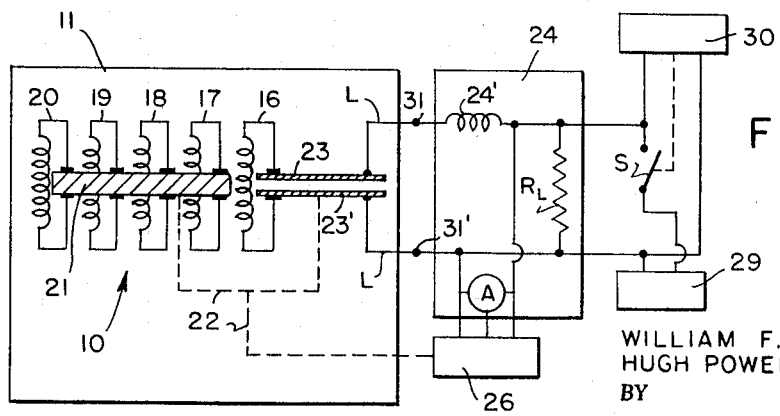
INVENTORS.
WILLIAM F. HASSEL
HUGH POWELL JENKINS, JR.
BY
ATTORNEY.

United States Patent Office 3,267,306
Patented August 16, 1966

3,267,306
SUPERCONDUCTING INDUCTIVE STORAGE
DEVICE
William F. Hassel, Lafayette, Ind., and Hugh P. Jenkins,
Jr., China Lake, Calif., assignors to the United States
of America as represented by the Secretary of the
Navy
Filed Sept. 9, 1963, Ser. No. 307,755
4 Claims. (Cl. 307—149)

The invention described herein may be manufactured and used by or for the Government of the United States of America for governmental purposes without the payment of any royalties thereon or therefor.

The present invention relates to an energy storage system and more particularly to a superconducting inductance coil system for storing and discharging electrical energy in a manner which accommodates continuous use over extended periods of time.

One of the most critical problems confronting designers of vehicle propulsion systems has been in the areas of energy source logistics. In many areas, the instant invention provides a practical solution for this problem, particularly in areas where factors of weight and bulk are of prime importance.

Conventional approaches to providing for vehicle contained energy sources utilize systems involving storage and transportation of chemical fuels, in order to operate internal combustion engines, turbo or ramjet power plants, rocket-type engines and the like, as well as nuclear power plants and electrolytic storage batteries.

The use of chemical fuels and oxdizers severely hinders basic vehicle design, due to the inherent weight and bulk limitations imposed through the fundamental requirement that large stores of chemicals must be transported over relatively great distances and continuously be made available for consumption over extended periods of time.

Recent advances in nuclear reactors have opened new vistas in energy source storage and transportation. However, nuclear reactors, at present, are exceptionally heavy and costly and, therefore, fail to provide feasible solutions in areas where given vehicles are to be airborne and/or propelled through the earth's atmosphere and celestial space, due to the excessive weight and bulk inherently associated with their design. Thus in many instances these systems are found to be incompatible with contemporary vehicle design.

An age old approach in providing for vehicle propulsion energy storage utilizes electrolytic storage batteries. Such systems have met with various levels of success, however, these systems are notoriously heavy and bulky, when compared to the quantity of usable energy afforded thereby, and for this reason, successful application of electrolytic storage batteries or systems has been limited primarily to areas wherein weight and bulk are considered to be of little importance.

Therefore, the purpose of this invention is to provide a light-weight energy storage system capable of delivering large quantities of usable electrical energy over extended periods of time, and in which the rate of power delivery to a given load is limited only by the characteristics of the load rather than inherent system limitations.

An object of the present invention is to provide a method and system for storing electrical energy.

Another object is to provide a high density light-weight electrical storage system from which electrical energy may be withdrawn in a controlled manner over an extended period of time.

A further object is to provide a light-weight, high-capacity, long-life electrical energy storage system for providing quantities of usable electrical energy in a controlled manner over extended periods of time.

Still a further object is to provide a light-weight energy source for use in propulsion systems which require the use of high-energy source systems capable of providing an output in a controlled manner over extended periods of time.

Other objects, advantages and novel features of the invention will become apparent from the following detailed description of the invention when considered in conjunction with the accompanying drawings wherein:

FIG. 1 is a cross-sectional view of a preferred embodiment of an electrical storage system as provided for in the instant invention;

FIG. 2 is a partial detail view of a portion of the electrical storage system, taken generally at 2 in FIG. 1; and FIG. 3 is a functional diagrammatic view of basic circuitry as provided for in the embodiment shown in FIG. 1.

Referring now more specifically to the drawings, wherein like reference characters designate like or corresponding parts throughout the several views, there is shown in FIG. 1 a solenoid coil, generally designated 10, disposed within a thermally insulated casing, generally designated 11, which may be formed by superimposing alternate layers of metallic supporting material 12 with layers of thermal insulating material 13.

For the sake of simplicity, the coil 10, FIG. 1, is depicted as being designed as a simple solenoid coil having many turns of thread-like wires 14 wound about a spool 15, which may be formed from any suitable dielectric material selected from among those materials conventionally utilized in solenoid coil winding operations.

The wires, or windings, 14 may be drawn from any one of several well-known superconducting metals or alloys presently available, and the characteristics of which are well-known, provided, the metals or alloys from which the wires 14 are drawn exhibit superconducting properties in a very high magnetc field when subjected to extreme temperatures at or below their transition point.

As liquid helium is utilized in the present invention for maintaining the temperature of the superconducting wires at a point approximating the metal's transition temperature, as will hereinafter be more fully explained, available alloys of niobium-tin or niobium-zirconium are preferred, since the temperature at the transition point approximates that of liquid helium under atmospheric conditions, i.e., approximately 4.2 degrees K.

As is well-known, once a current is generated in a superconducting closed-ring, or short-circuited coil, the current will continue to flow through the coil without apparent diminution, as no appreciable resistance loss is experienced within the wires of the coil. The amount of current which will flow through a superconducting wire of a coil will vary in direct proportion to the size and number of wires provided for in the coil. For example, it has been postulated that a wire which has diameter of one square centimeter can carry a current load of 200,000 amperes, however, as the diameter is reduced, the current load carrying capacity is likewise reduced.

As a practical matter, it has been found desirable to wind the coil 10 with many turns of a large number of readily available thread-like superconducting wires connected in circuit parallel, since superconducting wires having relatively large diameters are extremely difficult and impractical to produce, or procure.

The wires or conductors 14 of the coil 10 may be grouped into preselected numbers for forming a plurality of trunk-like banks. Each of the banks are insulated from the other, and are intended to conduct only a predetermined fractional portion of total coil current to thus, in effect, comprise one of a plurality of separate coils 16, 17, 18, 19, and 20 wound about a common spool 15.

Disposed in spaced relationship at opposite ends of each bank, there is provided a terminal contact surface. The surfaces are so arranged as to form pairs of contacts 16', 17', 18', 19', and 20', FIG. 1. A circuit may be established between the surfaces of each of the pairs of contacts by a short circuit device, such as a longitudinally displaceable shorting bar 21 which is so designed as to exhibit super-conducting characteristics.

The shortening bar 21 is displaceably disposed between each of the pair of contacts and is driven or displaced through a suitable drive-linkage 22. As illustrated in FIG. 2, the linkage 22 is provided with suitable dielectric means 22' and serves to slidingly displace the bar 21 in a reciprocating manner between the surfaces of the pairs of contacts 16'–20' so that the circuits of each bank may be selectively opened and closed as the bar 21 is selectively displaced with respect thereto. As the bar 21 is displaced, it engages a pair of contacts of a given bank so that a short circuited coil is formed thereby for establishing a path whereby the current of that bank may flow in an uninterrupted manner therethrough.

Arranged in longitudinally and in spaced relationship with the shorting bar 21, there is a pair of longitudinally disposed electrodes comprising electrodes 23 and 23'. The electrodes are formed from superconducting stock material and are provided with a combined cross section dimension approximating the cross section dimension of the bar 21. In practice, the pair of electrodes 23 and 23' may be provided with continuous contact surfaces 23a and 23a', which are caused to undergo longitudinal displacement simultaneously with the longitudinal displacement of the bar 21 in a manner such that the surfaces of the pair of electrodes may be said to "follow" the surfaces of the bar 21. As a practical matter, the drive-linkage 22 may be provided as a common linkage for driving the shorting bar 21 and the pair of electrodes 23 and 23', so that as each bank or coil circuit is opened between the contacts 16'–20', through displacement of the bar 21, it may be closed simultaneously therewith through an engagement of the contacts with the surfaces 23a and 23a' of the electrodes 23 and 23'.

While a longitudinal spacing between the shorting bar 21 and the pair of electrodes may be varied in accordance with various design parameters, a preferred embodiment of the present invention permits the spacing of the pairs of contacts 16'–20' to dictate the desired spacing for the bar and electrodes. A maximum spacing would permit the surfaces 23a and 23a' of the electrodes 23 and 23' to engage a pair of contacts simultaneously with the displacement of the bar 21 from therebetween as the drive linkage 22 is actuated. However, in order to reduce arcing, the spacing may be such that the electrodes engage a pair of bank contacts slightly before the shorting bar 21 is displaced from engagement therewith to thus, in effect, cause a momentary shorting out of any circuit connected with the electrodes 23 and 23'.

A load circuit, generally designated 24, is connected by means of appropriate leads L extending from the load circuit through a conventional plug member 25 to the electrodes 23 and 23'. An appropriate load, illustrated by a load resister $R_L$, FIG. 3, is connected with the load circuit 24 and, if so desired, may be utilized as an energy converting device for a conventional propulsion system, not shown.

The arrangement established between the electrodes 23, 23', the circuit leads L, and the plug 25 may be varied, however, the arrangement must be such as to permit the electrodes 23, 23' to be advanced by the linkage 22 in order to displace their surfaces into and out of engagement with the contacts of the banks 16–20 so that the current flowing within the banks may be diverted through the leads L to a given load or load circuit 24. Hence, it is to be understood that when the current flowing to the load circuit 24 from a bank, or plurality of banks 16–20, drops to a predetermined minimum value, the drive-linkage 22 may be actuated to displace the shorting bar 21 for introducing the surfaces of the terminals 23 and 23' between the next-in-line pair or pairs of contacts for increasing the current flow to a predetermined maximum level or initial value.

In order to maintain a current flow of brief duration in the load resistor $R_L$, as the current flow to the load circuit 24 is short circuited in the aforedescribed manner, an inductance coil 24' is connected in circuit series fashion ahead of the load resistor $R_L$. The reluctance value as provided for the coil 24', may be varied to be compatible with the load and the time period necessary for re-establishing a current flow through the load circuit 24.

In many instances, manually operative means may be found desirable for actuating the linkage 22. Such means are entirely feasible and may be employed to conserve power. However, various devices such as, for example, a suitable solenoid driven switch control mechanism 26, may be connected in circuit parallel with the load resistor $R_L$ to actuate the linkage 22 when the current flow through the load circuit 24 falls below a predetermined minimum value. Since construction and operation of such control mechanisms are well known, a detailed description thereof is omitted in the interest of brevity. It suffices to understand that the control mechanism is to be actuated to displace the bar 21 and the electrodes 23 and 23' to establish a current flow through the load circuit 24 from the next-in-line coil bank when the current flow, as detected by any suitable means A, in the load circuit 24 falls below a predetermined level, so that a current flow may be re-established through the load at a predetermined level. Therefore, as the number of turns and the size and number of wires for each coil bank serves to determine the current carrying capacity for that bank, the maximum power output from each bank may be varied in accordance with a predetermined load requirement curve for accommodating loads operating in a changing power requirement environment.

As aforementioned, the coil 10 is disposed within a thermally insulated casing 11 and is to be maintained at a desired temperature through the use of liquid helium. A liquid helium bath 27 is introduced through any suitable means, such as a threaded filler plug 28, into the casing 11 to completely surround the superconducting coil 10, the shorting bar 21, and the electrodes 23 and 23'. As a practical matter, the temperature of the liquid helium may not remain constant, due to heat imparted to the bath by certain environmental conditions to which the casing 11 may be operatively subjected. Therefore, in instances where the casing 11 is to be subjected to an extended period of heating, a refrigerating unit 29 and suitable cooling coils 29' may be connected with the load circuit 24 and driven by the stored electrical energy of the coil 10 to maintain the bath at a preselected temperature.

Additional refinements including a suitable thermostat or thermocouple means 30 having a pickup probe 30' may be used to constantly monitor the temperature of the helium bath 27 and control operation of the refrigerating unit 29, through a suitable switch S, for thus maintaining the bath 27 at a constant and desired temperature.

It is to be understood that in certain instances, the refrigerating unit 29 and/or its control means may be entirely eliminated. For example, these elements may be eliminated where the ambient temperature and period of operation is such as to preclude a significant heating of the liquid helium bath 27. Furthermore, the unit 29 may be controlled by means other than a thermostat or thermocouple unit. For example, a timing unit may be employed, or the unit 29 may be operated continuously. Hence, it is to be understood that the device of the present invention comprises a unique system which is readily adaptable to various operative environmental conditions.

In order to charge the coil 10, it is preferable to manually or otherwise actuate the linkage 22 in such a manner as to simultaneously position the electrodes 23 and 23' between each of the pairs of coil bank contacts 16'–20' and disconnect the load circuit 24, preferably at a pair of terminals 31 and 31' as may be provided within the pair of leads L. A D.C. generator of sufficient output capacity is connected across the coil 10 at the terminals 31 and 31'. The generator is then driven to initiate a current flow in the banks 16–20, whereupon the electrodes are displaced and the shorting bar 21 positioned between the contacts 16'–20'. The generator circuit may now be opened so that the generator established current flow in each of the banks continues through the shorting bar 21 in a manner similar to that of a current established closed-ring superconducting circuit. The current flow thus established comprises stored energy which may be made available to a given load circuit in a controlled manner at some subsequent period or periods of time.

The hereinbefore described system provides for a relative constant current output over an extended period of time, however, it is conceivable that in certain instances an exponential discharge rate may prove to be desirable for a given set of operative conditions. These conditions permit the use of a very simple coil, the turns of which are in circuit series, and a single pair of coil contacts so that a circuit across the contacts and through a load circuit may be closed in a simple manner. While such an arrangement is feasible for given limited operations, it has the inherent disadvantage of not being capable of providing a constant output current, and therefore is of limited utility when applied to systems in which continuous current level adjustments are of utmost importance.

In order to obtain maximum energy density storage within the system of the present invention, it is desirable a coil of the type having a configuration commonly referred to as a "force-free" magnetic coil configuration in which very high magnetic fields can be generated with an accompanying absence of appreciable magnetic pressures acting upon the conductors. Normally, fields greater than 30 webers/m.$^2$ approach or exceed the tensile strength limits of conventional coil materials, whereas, fields considerably in excess of 100 webers/m.$^2$ may be achieved when utilizing coils having "force-free" configurations.

In operation, the system of the instant invention is first charged and so that a current flow is established in each of the banks 16–20 of the coil 10, between the contacts 16'–20' through the shorting bar 21. In this condition current continues to flow for an indefinite duration, due to the known characteristics of superconducting materials. At a point in time when it is desired to drive a given load $R_L$ connected with the load circuit 24, the linkage 22 is activated to actuate the shorting bar 21 for displacing it from between the first pair of contacts 16', whereupon the electrodes 23, 23' will be displaced to be disposed therebetween. Current normally flowing in bank 16 will now be directed through the load circuit 24. As power is dissipated by the load $R_L$, the current value will be caused to drop. Once a predetermined minimum current level is reached, it becomes necessary to re-establish a predetermined operative current value for the current flow through the load circuit. This may be accomplished by again activating the drive-linkage 22 in the aforementioned manner to advance the electrodes 23, 23' into engagement with the next-in-line pair of contacts. This procedure may be successively repeated until the stored energy is depleted.

Due to the predetermined spacing established between the shorting bar 21 and the pair of electrodes 23, 23', the bar 21 does not completely vacate a position between the pair of contacts before the electrodes 23, 23' are moved into engagement therewith. Hence, as the linkage 22 is activated the load circuit will be effectively shorted out whereby little or no arcing between the contacts and the electrodes will be experienced. Continued actuation of the drive-linkage 22 serves to displace the shorting bar 21 from between the contacts and serves to move the electrodes 23 and 23' to a fully seated position therebetween. As current levels fall in succession, the bar and electrodes are successively displaced with respect to the next-in-line pair of contacts, as provided for each successive coil bank of the coil 10, to thus re-establish a predetermined value for the current flow imposed across a given load circuit.

In accordance with the foregoing description of the present invention, it is to be understood that there has been provided an electrical storage system which may continuously function in a controlled manner over an extended period of time as an energy source for a given operative system, such as, for example, a vehicle propulsion system.

Obviously many modifications and variations of the present invention are possible in the light of the above teachings. It is therefore to be understood that within the scope of the appended claims the invention may be practiced otherwise than as specifically described.

What is claimed is:

1. An electrical storage system, comprising in combination:
  a plurality of consecutive superconducting coil banks each having means defining an open circuit and being wound about a common center in the form of a unitary inductance coil;
  a displaceable connecting means for completing said open circuit of each of said banks and for connecting said banks in circuit parallel;
  a pair of displaceable electrodes;
  means for connecting said electrode with a given load resistance;
  means for successively displacing said displaceable connecting means for thereby successively isolating the consecutive banks and establishing open circuits therefor; and
  means for successively displacing said pair of electrodes to close said open circuits of said consecutive banks through said load resistance simultaneously with the establishing of said open-circuits, whereby current flow is diverted through said load circuit as each open circuit is established.

2. The storage system of claim 1, further including:
  a liquid helium bath surrounding said coil, said electrodes, and said connecting means; and
  means for maintaining said liquid helium at a predetermined temperature for maintaining said coil banks in a superconductive state.

3. An electrical energy storage system comprising, in combination:
  an inductance coil wound of wires formed from superconducting intermetallic alloys;
  means for establishing a plurality of adjacent open circuit coil banks within said coil by aligning said wires into distinct groups terminating at spaced end points and arranged in an in-line relationship with respect to the end points of each adjacent bank;
  a terminal contact connected at each end point of each of the banks so as to provide each with a pair of spaced contacts arranged in spaced relationship with respect to adjacent pairs;
  a shorting bar formed of superconducting intermetallic alloy and having an over-all length such that simultaneous engagement may be established between said bar and each of said terminal contacts of said banks;
  a pair of spaced elongated electrodes arranged in parallel relationship for simultaneously contacting opposite terminal contacts of each bank;
  a load circuit connected across said electrodes; and
  means for simultaneously displacing said bar for disengagement with a given pair of contacts and displacing said electrodes for engagement therewith, whereby a current flow established within said bank and flowing through said bar may be selectively diverted through said load circuit.

4. In an inductive storage device, means comprising:
a plurality of individual superconducting inductance coil banks;
means for connecting said banks in circuit parallel to form a unitary inductance coil for conducting a plurality of individual currents within said plurality of banks of said coil;
means for successively diverting said individual currents from said coil to a given load circuit; and
means for isolating each of said coil banks as said current is diverted therefrom, so that the currents of said coil banks may be selectively depleted in consecutive steps.

References Cited by the Examiner

UNITED STATES PATENTS

| | | |
|---|---|---|
| 3,094,628 | 6/1963 | Jin. |
| 3,098,967 | 7/1963 | Keck. |
| 3,219,841 | 11/1965 | Edwards et al. _____ 307—88.5 |

JOHN F. COUCH, *Primary Examiner.*

W. SHOOP, *Assistant Examiner.*